United States Patent [19]

Hazu

[11] Patent Number: 5,455,841
[45] Date of Patent: Oct. 3, 1995

[54] VARIABLE BIT RATE BANDWIDTH COMPRESSION TRANSMISSION THROUGH A NETWORK HAVING CELL LOSS PROBABILITY

[75] Inventor: Fumie Hazu, Tokyo, Japan

[73] Assignee: NEC Corporation, Tokyo, Japan

[21] Appl. No.: 916,606

[22] Filed: Jul. 22, 1992

[30] Foreign Application Priority Data

Jul. 22, 1991 [JP] Japan ................................ 3-180781
Jan. 23, 1992 [JP] Japan ................................ 4-009602

[51] Int. Cl.$^6$ ............................... H04B 1/66; H04J 3/12
[52] U.S. Cl. ............................... 375/240; 370/110.1
[58] Field of Search .................. 348/390, 393, 348/395, 397, 398, 403, 404, 405, 408, 426, 427, 437; 370/110.1, 118; 375/122; 341/141, 155

[56] References Cited

U.S. PATENT DOCUMENTS

| 4,713,776 | 12/1987 | Araseki | 375/122 |
| 5,122,875 | 6/1992 | Raychaudhuri et al. | 370/110.1 |
| 5,140,417 | 8/1992 | Tanaka et al. | 375/122 |
| 5,148,272 | 9/1992 | Acampora et al. | 370/110.1 |
| 5,150,387 | 9/1992 | Yoshikawa et al. | 375/122 |
| 5,166,686 | 11/1992 | Sugiyama | 375/122 |

*Primary Examiner*—Stephen Chin
*Assistant Examiner*—Duane Kobayashi
*Attorney, Agent, or Firm*—Sughrue, Mion, Zinn, Macpeak & Seas

[57] ABSTRACT

Digital samples of an analog speech/music signal are converted to compressed digital samples from which first and second bit assignment signals are derived to respectively represent quantization levels corresponding to high and low transmission rates. The compressed digital samples are quantized according to the first bit assignment signal and split into higher significant bits corresponding to the second bit assignment signal and lower significant bits corresponding to the difference between the two bit assignment signals. Supplementary information is combined with the higher significant bits and assembled into a higher-priority cell for transmission to an ATM network and the corresponding lower significant bits are assembled into a lower-priority cell which may be discarded by the network. At the destination, the supplementary information is used to recover the first and second bit assignment signals. Using the recovered second bit assignment signal and the difference between the two bit assignment signals, the higher significant bits are combined with the corresponding lower significant bits when the lower-priority cell is present and combined with synthesized lower significant bits when the lower-priority cell is absent. The combined bits are dequantized according to the recovered first bit assignment signal and decompressed to recover the original digital samples.

13 Claims, 9 Drawing Sheets

FIG. 4
Bit Combiner 25

VARIABLE BIT RATE BANDWIDTH COMPRESSION TRANSMISSION THROUGH A NETWORK HAVING CELL LOSS PROBABILITY

RELATED APPLICATION

The present invention is related to co-pending U.S. patent application Ser. No. 07/728,679, Fumie Hazu, "Adaptive Bit Assignment Transform Coding According to Power Distribution of Transform Coefficients", filed Jul. 12, 1991, and assigned to the same assignee as the present application.

BACKGROUND OF THE INVENTION

The present invention relates generally to bandwidth compression techniques for digital audio signals, and more particularly to a variable transmission rate communication system for a network having a cell loss probability such as an asynchronous transfer mode (ATM) network.

Adaptive differential pulse-code modulation (ADPCM) technique is known as a practical way of bandwidth compression and has been extensively used in digital communications. According to this method, input discrete speech samples are buffered to form a block of N speech samples each. All samples of each block are linearly transformed into a group of transform coefficients based on a linear transform. These transform coefficients are then adaptively quantized independently and transmitted. At the receiver, the quantized signals are adaptively dequantized according to a supplementary signal that is derived in a manner inverse to that of the transmitter, and an inverse transform is taken to obtain the corresponding block of reconstructed audio samples.

Another bandwidth compression technique that is attractive for audio signals is the adaptive transform coding scheme (ATC) as shown and described in "Approaches to Adaptive Transform Speech Coding at Low Bit Rates", Rainer Zelinski et al, IEEE Transactions on ASSP, Vol. 27, No. 1, 1979, pages 89–95. A further approach is described in "A Musicam Source Codec for Digital Audio Broadcasting and Storage", Y. F. Dehery et al, Proceedings of ICASSP '91, Vo.. 5, 1991, pages 3605–3608, in which digital audio samples are divided into frequency subbands and each subband is adaptively quantized according to a bit assignment signal.

A technique for ensuring the quality of transmission against lost packets is described in "Embedded DPCM for Variable Bit Rate Transform", D. J. Goodman, IEEE Transactions on Communications, Vol. COM-28, No. 7, July 1980, pages 1040–1046. According to this approach, when least significant bits are discarded by a channel, and the decoder inserts all-zero filler bits to the lost bits prior to decoding.

However, the ATC technique is superior to the DPCM technique in terms of bandwidth compression, and it has been desired to ensure against lost cells when the bandwidth compression technique is used for ATM networks.

SUMMARY OF THE INVENTION

It is therefore an object of the present invention to provide a data compression communication system and method which minimizes the effect of lost cells.

According to a first aspect of the present invention, N digital samples of an underlying audio-frequency analog signal are converted to N compressed digital samples from which first and second bit assignment signals are derived. The first assignment signal is representative of quantization levels of each of the compressed digital samples corresponding to a first predetermined transmission rate, and the second bit assignment signal is representative of quantization levels of each of the compressed digital samples corresponding to a second predetermined transmission rate lower than the first predetermined transmission rate. A first differential signal is generated to represent the difference between the first and second bit assignment signals. The N compressed digital samples are quantized according to the first bit assignment signal and each of the quantized N compressed digital samples is split into higher significant bits and lower significant bits, the number of the lower significant bits being equal to the number of quantization levels represented by the first differential signal. The first and second bit assignment signals are used as supplementary information, which is combined with the higher significant bits of N digital samples into a higher-priority cell for transmission to an ATM network where it is not discarded and the lower significant bits of the N digital samples are assembled into a lower-priority cell for transmission to the network where it may be discarded during an overflow period. The higher- and lower-priority cells from the network are received by a destination where the higher-priority cell is decomposed into the higher significant bits of N digital samples and the first and second bit assignment signals and the lower-priority cell is decomposed into the lower significant bits. A second differential signal representative of the difference between the decomposed first and second bit assignment signals is derived. According to the decomposed second bit assignment signal and second differential signal, the decomposed higher significant bits of the N digital samples are respectively combined with the corresponding lower significant bits to produce a replica of the quantized N compressed digital samples when the lower-priority cell is present. When the lower-priority cell is absent, the higher significant bits are combined with synthesized lower significant bits to produce a pseudo-replica of the quantized N compressed digital samples. The quantized N compressed digital samples of both the replica and the pseudo-relica are dequantized according to the decomposed first bit assignment signal and converted to a decompressed signal.

In a second aspect of the present invention, the supplementary information is derived independently of the first and second bit assignment signals from the compressed N digital samples. At the destination, the transmitted supplementary information is used to recover the first and second bit assignment signals.

BRIEF DESCRIPTION OF THE DRAWINGS

The present invention will be described in further detail with reference to the accompanying drawings, in which.

DETAILED DESCRIPTION

Figure 1:
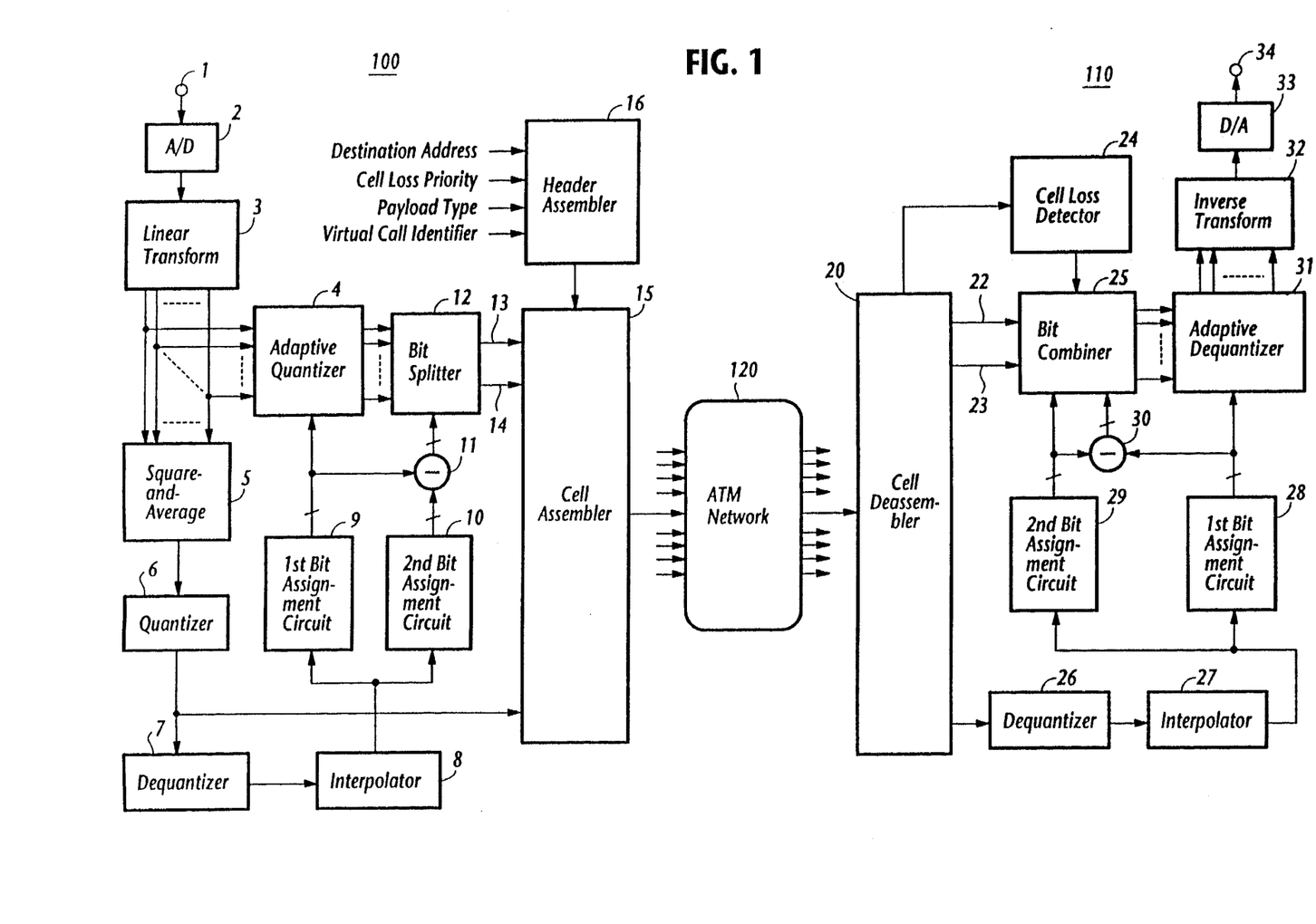
FIG. 1 is a block diagram of a variable transmission rate communication system according to a first embodiment of the present invention.

In FIG. 1, there is shown a cell-loss tolerant digital communication system according to a first embodiment of the present invention. The system includes a transmitter 100 and a receiver 110 interconnected by way of an asynchronous transfer mode (ATM) switched network 120. At the transmitter 100, an audio-frequency analog signal such as speech or music is supplied through an input terminal 1 to an analog-to-digital converter 2 where it is sampled at sampling rate $f_s$ and converted to digital form and applied to a linear transform coder 3. Linear transform coder 3 includes buffer in which digital samples are stored to form an input vector, or block of N digital samples which are converted to a block of N transform coefficients and delivered therefrom as an output vector. The Walsh-Hadamard transform, the discrete Fourier transform, the discrete cosine transform and the Karhunen-Loéve transform are suitable linear transform coding for this purpose. The output of linear transform coder 2 is applied to an adaptive quantizer 4 having quantizer elements for respectively quantizing the transform coefficients according to a bit assignment signal which is supplied from a first bit assignment circuit 9, indicating the number of quantization levels into which each transform coefficient is to be quantized. The output of linear transform coder 4 is also applied to a square-and-average circuit 5 in which N transform coefficients of each block are squared and an average value of neighboring K squared values is taken as a representative value. Therefore, L (=N/K) averaged coefficients are taken from every N squared coefficients. The L averaged coefficients are quantized by a quantizer 6 and fed to a cell assembler 15 as supplementary information in which it is combined with higher significant bits of quantized versions of compressed N digital samples and transmitted in a higher-priority cell to ATM (asynchronous transfer mode) network 120. As will be described, the lower significant bits of the quantized N digital samples are transmitted on a lower-priority cell to the ATM network in which it may be discarded.

The output of square-and-average circuit S is further applied to a dequantizer 7 whose output is applied to an interpolator 8 in which the logarithm to the base 2 is taken and M-1 interpolations are provided between successive coefficients. The output of interpolator 8 is fed to the first bit assignment circuit 9 and a second bit assignment circuit 10 in each of which the following Equation is calculated:

$$R_i = \overline{R} + 0.5 \log_2 \sigma_i^2 - 0.5N \sum_{n=1}^{N} \log_2 \sigma_n^2$$

where, $R_i$ is the number of bits assigned to an i-th transform coefficient, $\overline{R}$ is the average number of bits assigned to each transform coefficient, and $\sigma_i^2$ is a squared value of the i-th interpolated transform coefficient. The first bit assignment circuit 9 calculates a first bit assignment value (i.e., the number of quantizing bits assigned to each transform coefficient) for each transform coefficient from the power of the corresponding transform coefficient such that it can be transmitted at a coding rate $\alpha$ which corresponds to a transmission rate when both of the higher-priority cell and lower-priority cell are transmitted through the network to a destination.

The first bit assignment values for the N transform coefficients of each block are represented by a vector $P=\{h_{11}, h_{12}, \ldots h_{1N}\}$ and the total number of quantization bits is equal to $\alpha \cdot N/f_s (=h_{11}+h_{12}+\ldots+h_{1N})$. The N transform coefficients of each block are quantized by the elements of the quantizer 4 into discrete levels represented by the vector P and supplied to a bit splitter 12. The second adaptive bit assignment circuit 10, on the other hand, calculates a second bit assignment value for each transform coefficient from the power of the corresponding transform coefficient such that it can be transmitted at a coding rate $\beta$ which is lower than $\alpha$ and corresponds to a transmission rate at which it is received by the destination when the lower priority cell is discarded by the network. The second bit assignment values for the N transform coefficients of each block are represented by a vector $Q=\{h_{21}, h_{22}, \ldots h_{2N}\}$, where $h_{21}+h_{22}+\ldots+h_{2N}=\beta \cdot N/f_s$.

The quantization bit assignment values from the first and second bit assignment circuits 9 and 10 are fed to a subtractor 11 where a differential value between the first and second bit assignment values is taken for each transform coefficient and applied to a bit splitter 12 and produces outputs which are represented by a vector $R=\{k_1, k_2, \ldots k_N\}$, where $k_1+k_2+\ldots+k_N=(\alpha-\beta) \cdot N/f_s$.

Figure 3:
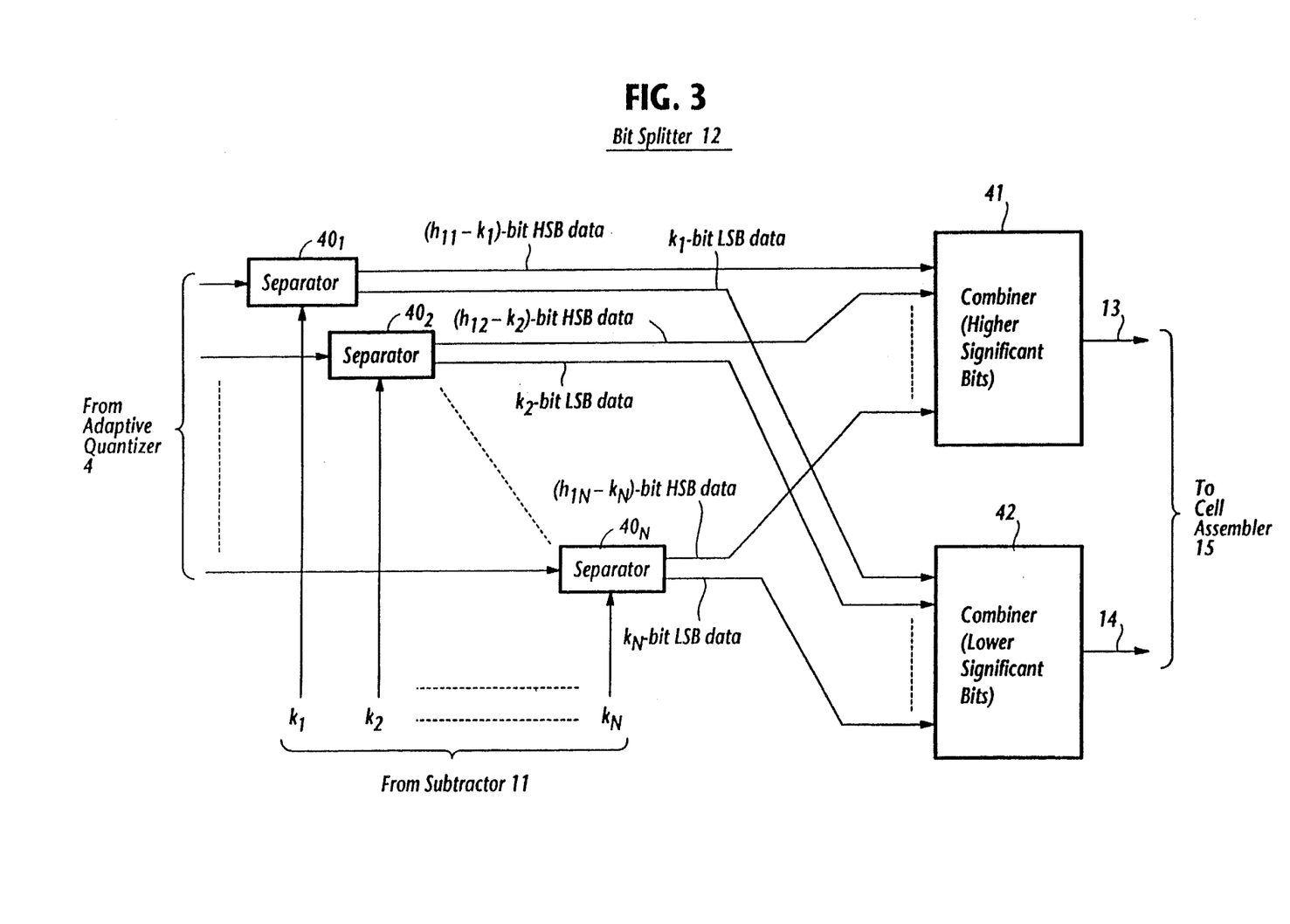
FIG. 3 is a block diagram of a bit splitter employed at the transmitter of the present invention.

Bit splitter 12 divides the quantized N transform coefficients of each lock into higher significant bits and lower significant bits according to the differential bit assignment value for coupling through lines 13 and 14, respectively, to cell assembler 15. As shown in FIG. 3, bit splitter 12 comprises separators $40_1 \sim 40_N$ corresponding respectively to the quantized N transform coefficients from quantizer 4, and combiners 41 and 42. Each of the separators $40_1 \sim 40_N$ receives the respective element of the differential vector $R=\{k_1, k_2, \ldots k_N\}$ from subtractor 11 and splits each set of $h_{1j}$ (where j=1, 2, ... N) bits from the respective quantizer output into a $(h_{1j}-k_j)$-bit higher-significant-bit (HSB) data segment and a $k_j$-bit lower-significant-bit (LSB) data segment. The HSB data segments from separators $40_1 \sim 40_N$ are combined by and serially output from combiner 41 through line 13 to cell assembler 15 and the LSB data segments are combined by and serially output from combiner 42 through line 14 to cell assembler 15. Since Q=P–R, each HSB data segment comprises $h_{2j}$ bits.

Figure 2:
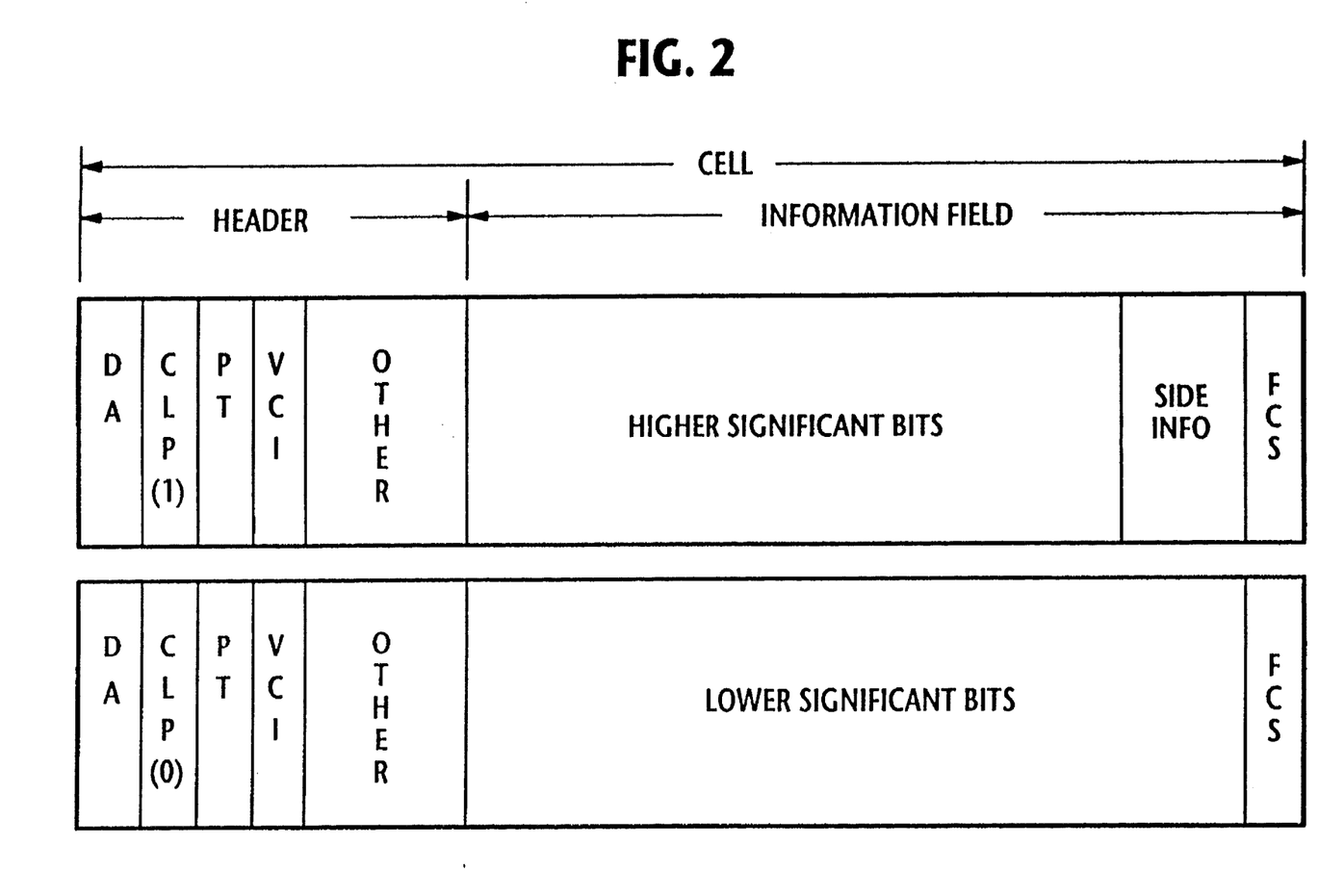
FIG. 2 shows data structures of cells respectively containing higher and lower significant bits of a coded signal.

A header assembler 16 is provided for forming a cell header according to the cell format of BISDN (Broadband Integrated Services Digital Network) recommended by CCITT by organizing a destination address (DA), cell loss priority data (CLP), a payload type (PT) and a virtual call identifier (VCI) and other necessary header information. The header is multiplexed with the higher and lower significant bits from bit splitter 12 and the supplementary information from quantizer 6. As shown in FIG. 2, the higher significant bits and supplementary information are combined with a cell header containing a higher cell loss priority bit "1" and the lower significant bits are combined with a header containing a lower cell loss priority bit "0". The lower cell loss priority indicates that the cell containing the lower significant bits can be discarded when the network is overflowed, and the higher cell loss priority indicates that the cell containing the higher significant bits is the one that cannot be discarded under any circumstances. Each cell is appended with a frame check sequence (FCS) for error detection and correction to be performed at the destination.

At the entry point of the ATM network 120, the VCI and destination address of each cell are examined to determine a path through the network to the destination and at every node of the network the cell loss priority data is examined when a traffic overflow occurs to discard the associated cell if it contains "0".

Returning to FIG. 1, the signal transported through the ATM network 120 is delivered at the exit point of the network is to the receiver 110 where it is applied to a cell deassembler 20 which examines the contents of each cell header and higher significant bits contained in a higher priority cell are fed through line 22 to a bit combiner 25 and the supplementary information contained in it is supplied to a dequantizer 26, whereas lower significant bits contained in a lower priority cell are fed through line 23 to bit combiner 25. A cell loss detector 24 is connected to the cell deassembler 20 examines the arrival of cell headers to determine whether a cell is discarded by the network and provides an output indicating the cell loss state to bit combiner 25. Bit combiner 25 produces a set of N outputs which are coupled to an adaptive dequantizer 31 having N dequantizer elements.

An interpolator 27 is connected to the output of dequantizer 26 to produce an output corresponding to the output of interpolator 8 at the transmitter 100 and feeds a first bit assignment circuit 28 and a second bit assignment circuit 29 which are identical in construction to the first and second bit assignment circuits 9 and 10 of the transmitter, respectively. Therefore, first and second bit assignment circuit 28 and 29 produce a vector $P=\{h_{11}, h_{12}, \ldots h_{1N}\}$ and a vector $Q=\{h_{21}, h_{22}, \ldots h_{2N}\}$. The outputs of first bit assignment circuit 28 are applied to a subtractor 30 and adaptive dequantizer 31, and the outputs of second bit assignment circuit 29 are supplied to subtractor 30 and bit combiner 25. Subtractor 30 corresponds in function to the subtractor 11 and produces a differential vector and applied it to bit combiner 25. The outputs of dequantizer 31 are fed into an inverse transform coder 32 where inverse linear transform, a process inverse to that of coder 3, is performed on the dequantized transform coefficients to produce a digital signal corresponding to the output of A/D converter 2. The output of inverse linear transform coder 32 is converted to analog form by a digital-to-analog converter 33 for coupling to an output terminal 34.

Figure 4:
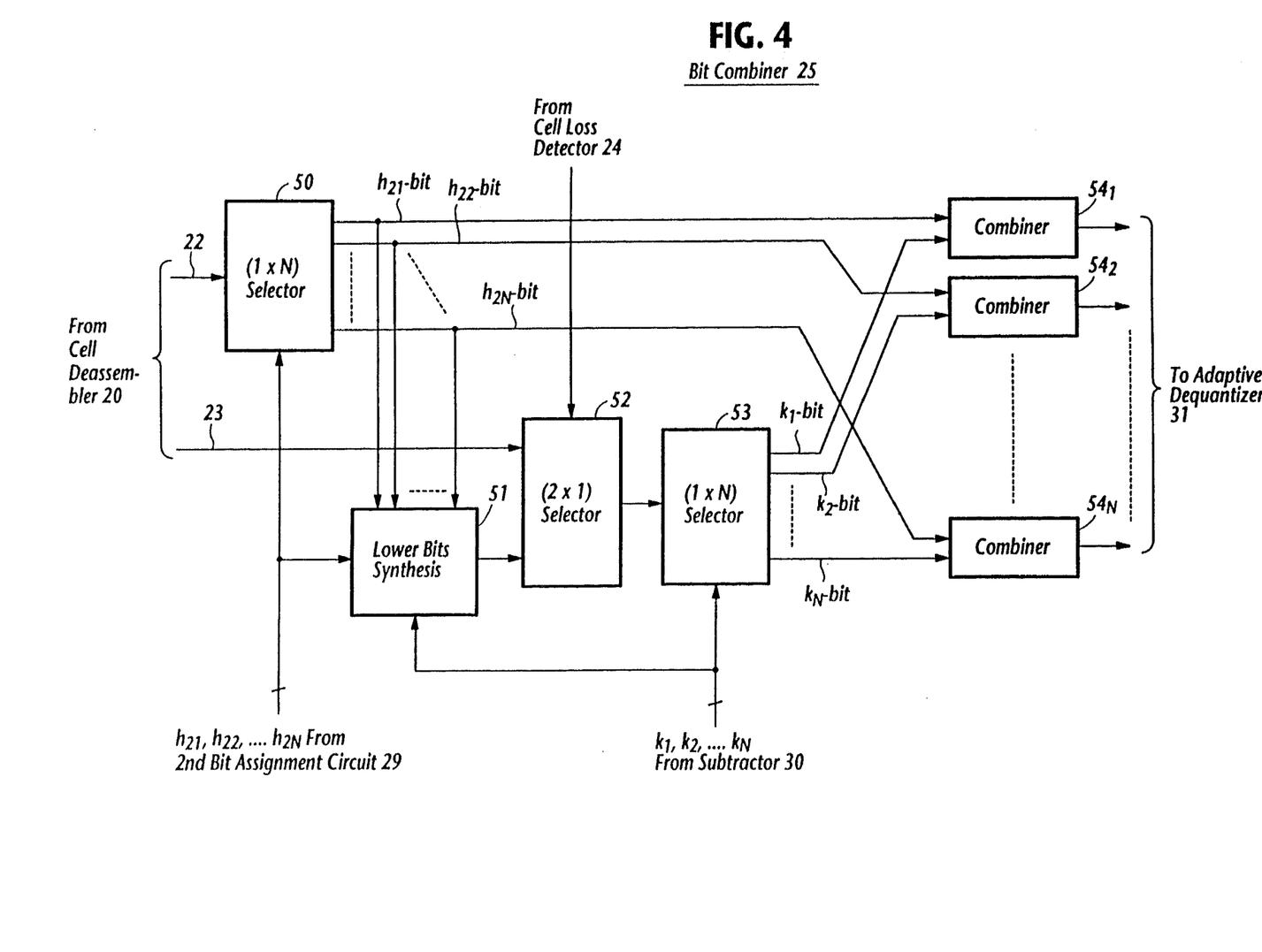
FIG. 4 is a block diagram of a bit combiner employed at the receiver of the present invention.

As shown in FIG. 4, bit combiner 25 includes a (1×N) selector 50 which is coupled to the cell deassembler 20 through input line 22 to selectively couple the incoming higher significant bits of each block according to the outputs of second bit assignment circuit 29 to one of combiners $54_1 \sim 54_N$, which are connected respectively to the inputs of dequantizer 31. Therefore, $h_{21}$-bit, $h_{22}$-bit, ... $h_{2N}$-bit HSB data are respectively applied to combiners $54_1, 54_2, \ldots 54_N$. The outputs of selector 50 are further connected to a lower bits synthesis circuit 51 to which the outputs of bit assignment circuit 29 and subtractor 30 are also applied. A (2×1) selector 52 is provided having a first input connected to the cell deassembler 20 through line 23 to receive lower significant bits and a second input connected to the output of lower bits synthesis circuit 51. Selector 52 is responsive to the output of cell loss detector 24 to selectively couple one of its input signals to a (1×N) selector 53. Selector 53 responds to the outputs of subtractor 30 to selectively connect the signal from selector 52 to one of combiners $54_1 \sim 54_N$ in a manner similar to selector 50 so that $k_1$-bit, $k_2$-bit, ... $k_N$-bit LSB data are respectively applied to combiners $54_1, 54_2, \ldots 54_N$. If no transmitted cells are discarded by the ATM network, cell loss detector 24 produces a logic 0 and (2×1) selector 52 selects the signal on line 23. If a lower priority cell is discarded by the network, detector 24 produces a logic 1 and selector 52 responds to it by selecting the output of lower bits synthesis circuit 51.

Figure 5A:
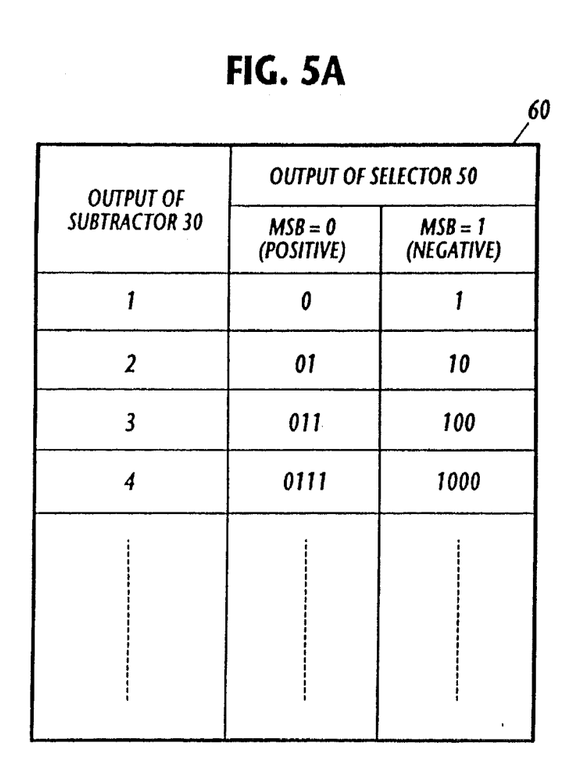
FIG. 5A shows a conversion table for storing mapped data to be used for lower significant bits in the case of a cell loss situation.
Figure 5B:
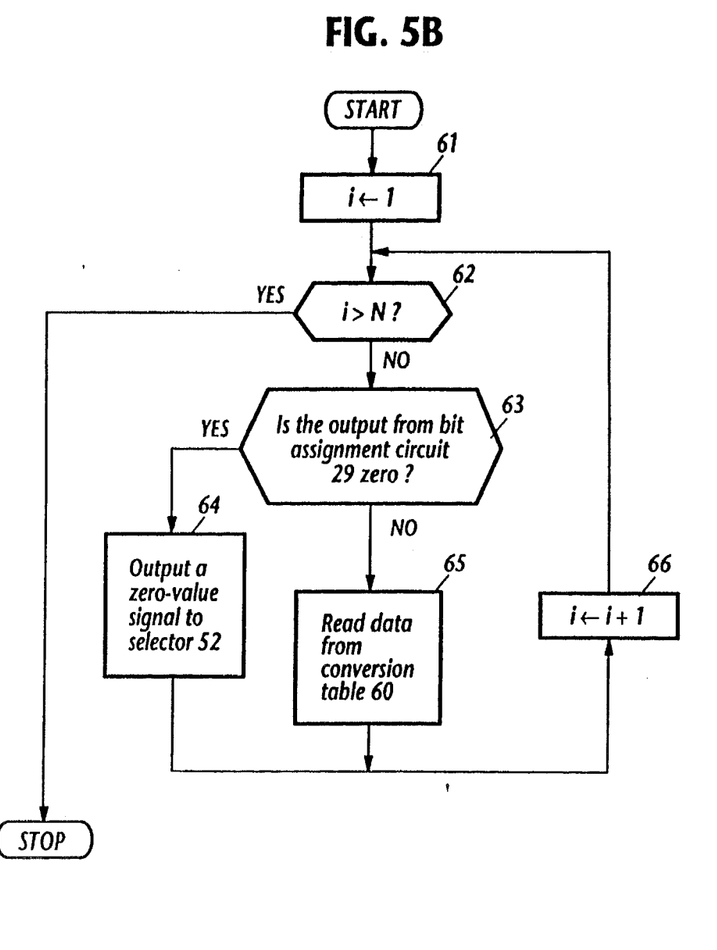
FIG. 5B is a flowchart for addressing the conversion table.

Lower bits synthesis circuit 51 includes a conversion table 60 as shown in FIG. 5A and a controller associated with it. Conversion table 60 defines a map between the outputs $(=k_1 \sim k_N)$ of subtractor 30 and a set of output codes of different bit lengths according to the logic values of the MSB (most significant bit) of each of the outputs $(=h_{21} \sim h_{2N})$ of selector 50. The controller of synthesis circuit 51 is programmed as shown in FIG. 5B to access the conversion table. When an incoming signal is received, variable i is set equal to one (step 61) and checked with the value N (step 62). If i is smaller than N, control branches at step 62 to step 63 to check to see if the i-th element of vector Q, i.e., $h_{2i}$ from bit assignment circuit 29 is zero. If the answer is affirmative, control branches at step 63 to step 64 to output a zero-value signal to selector 52 and control exits to step 66 to increment the variable i by one, and returns to step 62 to repeat the process. If the answer is negative in step 63, control branches to step 65 to enable the conversion table 60 to respond to the output of subtractor 30 to read data from the corresponding location and supplies it to selector 52. The above process is continued until variable i becomes equal to N.

Figure 6:
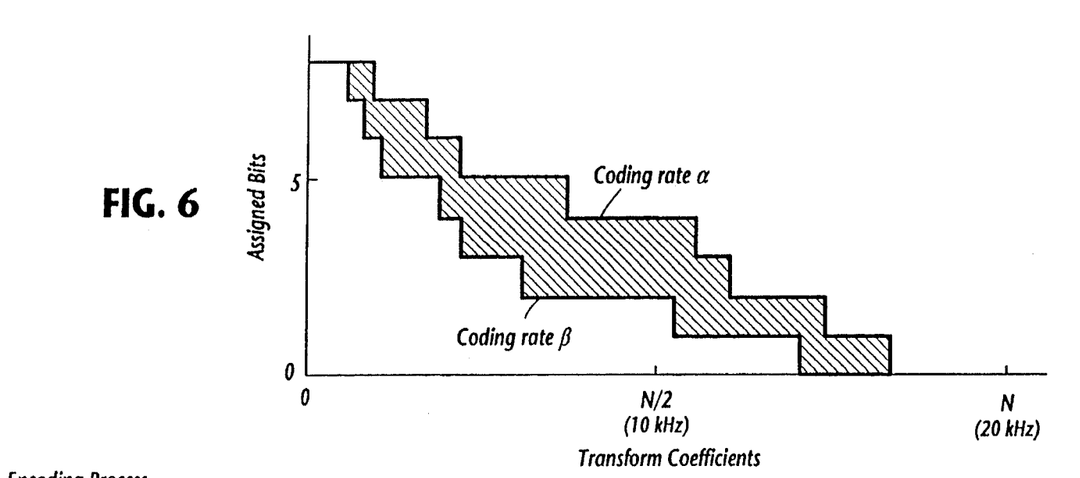
FIGS. 6 and 7 are views useful for describing the operation of the present invention.
Figure 7:
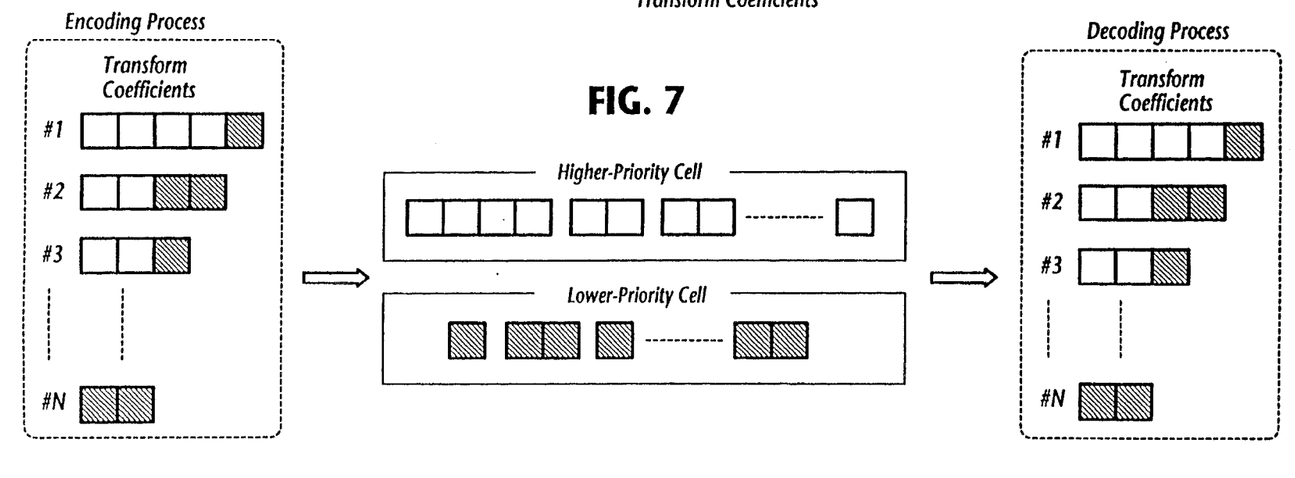

One example of the bit assignment as a function of the frequency of transform coefficients is shown in FIG. 6 with coding rates α and β as parameters. FIG. 7 illustrates the encoding and decoding processes of the present invention. Assume that transform coefficients #1, #2, #3 and #N are respectively quantized into five, four, three and two bits. Four higher significant bits of transform coefficient #1 are organized corresponding to the value of vector element $h_{2i}$ and carried on a higher-priority cell and the least significant bit (as indicated by hatching) of the transform coefficient is carried on a lower-priority cell. Two higher significant bits of transform coefficient #2 are organized corresponding to the value of vector element $h_{22}$ and carried on the higher-priority cell and the other two lower significant bits of the transform coefficient are carried on the lower-priority cell. Likewise, the higher two significant bits of transform coefficient #3 are carried on the higher-priority cell with the remainder being carried on the lower-priority cell. Transform coefficient #N has all of its bits carried on the lower-priority cell. In the latter case, the number of quantizing bits assigned by the second bit assignment circuit 10 is zero, and hence $k_N$ is equal to $h_{1N}$ and no higher significant bits exist for transform coefficient #N as is seen from FIG. 3. The total amount of information transmitted according to the present invention corresponds to the integration of the assigned bits by frequencies of the transform coefficients. Specifically, the total amount of information that is carried by higher-priority cells corresponds to the non-hatched area of FIG. 6 delineated by lines indicated as coding rate β and the total amount of information carried by lower-priority cells corresponds to the hatched area of FIG. 6 defined between lines indicated as coding rates α and β. At the receiver, corresponding higher and lower significant bits are concatenated to reconstruct the original transform coefficient.

Figure 8:
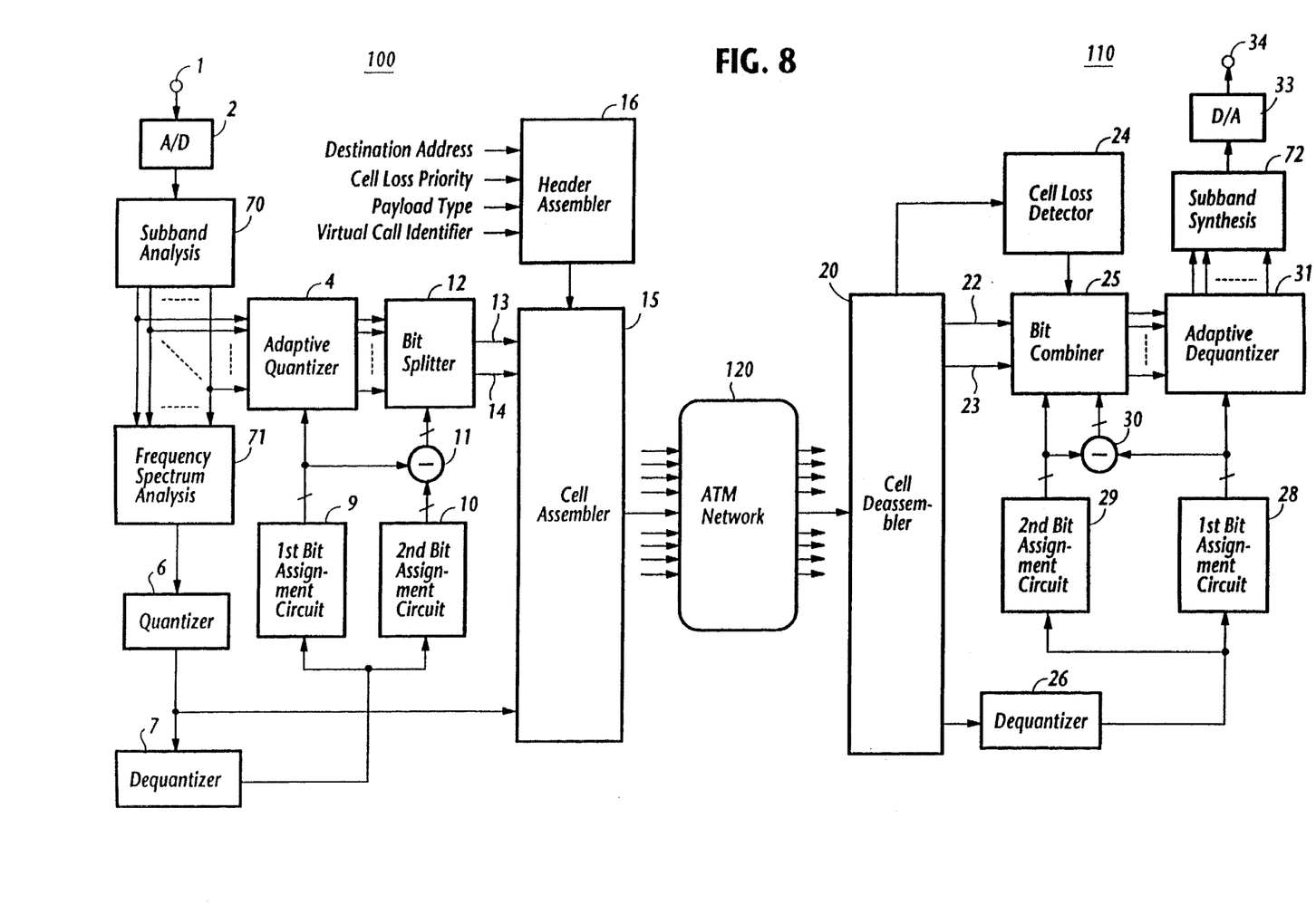
FIG. 8 is a block diagram of a modified embodiment of FIG. 1.

FIG. 8 is a block diagram of a second embodiment of this invention. This embodiment is similar to the embodiment of FIG. 1 with the exception that the linear transform coder 3 and square-and-average circuit 5 are respectively replaced with a subband analyzer 70 and a frequency spectrum analyzer 71, the inverse linear transform coder 32 is replaced with a subband synthesis circuit 72, and interpolators 8 and 27 are eliminated.

Subband analyzer 70 is implemented by a bank of quadrature mirror filters which is described in detail in a paper "A Musicam Source Codec for Digital Audio Broadcasting and Storage", Y. F. Dehery et al, Proceedings of ICASSP '91, Vo.. 5, 1991, pages 3605-3608. Subband analyzer 70 includes a buffer in which M digital samples supplied from A/D converter 2 at sampling rate $f_s$ are stored as an input vector. This input vector is divided into N frequency subbands, where M is equal to an integral multiple of the integer N. The N subband signals from analyzer 70 are supplied to frequency spectrum analyzer 71 as well as to quantizer 4. Frequency spectrum analyzer 71 derives a signal indicating the envelope of the power of each subband and serially sends it to cell assembler 15 after having being quantized by quantizer 6. Dequantizer 7 applies a dequantized version of the quantizer output to bit assignment circuits 9 and 10 where bit assignment values are respectively determined from the power envelope of each subband so that the coding rates of both circuits corresponds respectively to $\alpha$ and $\beta$ to produce a bit assignment vector $P=\{h_{11}, h_{12}, \ldots h_{1N}\}$ from first bit assignment circuit 9 and a bit assignment vector $Q=\{h_{21}, h_{22}, \ldots h_{2N}\}$. The total number of bits assigned by circuit 9 is equal to $h_{11}+h_{12}+\ldots+h_{1N}=M\cdot\alpha/f_s$ and the total number of bits assigned by circuit 10 is equal to $h_{21}+h_{22}+\ldots+h_{2N}=M\cdot\beta/f_s$. Subtractor 11 produces a differential vector $R=\{k_1, k_2 \ldots k_N\}$, and the total number of differential bits is equal to $k_1+k_2+\ldots+k_N=M(\alpha-\beta)/f_s$.

After quantization by quantizer 4, the quantized N subband signals are applied to bit splitter 12. As many higher significant bits of each quantized subband signal are organized as there are bits contained in the output ($=h_{2j}$) of second bit assignment circuit 10 and carried on a higher-priority cell and the remainder is carried on a lower-priority cell as in the previous embodiment.

At the receiver, bit combiner 25 operates in the same fashion as in the previous embodiment so that N quantized subband signals appear at the inputs of dequantizer 31. The receiver differs from the previous embodiment by the use of subband synthesis circuit 72 instead of the inverse linear transform coder. Subband synthesis circuit 72 provides a process inverse to that of subband synthesizer 70 to recover the original digital signal from the outputs of dequantizer 31.

Figure 9:
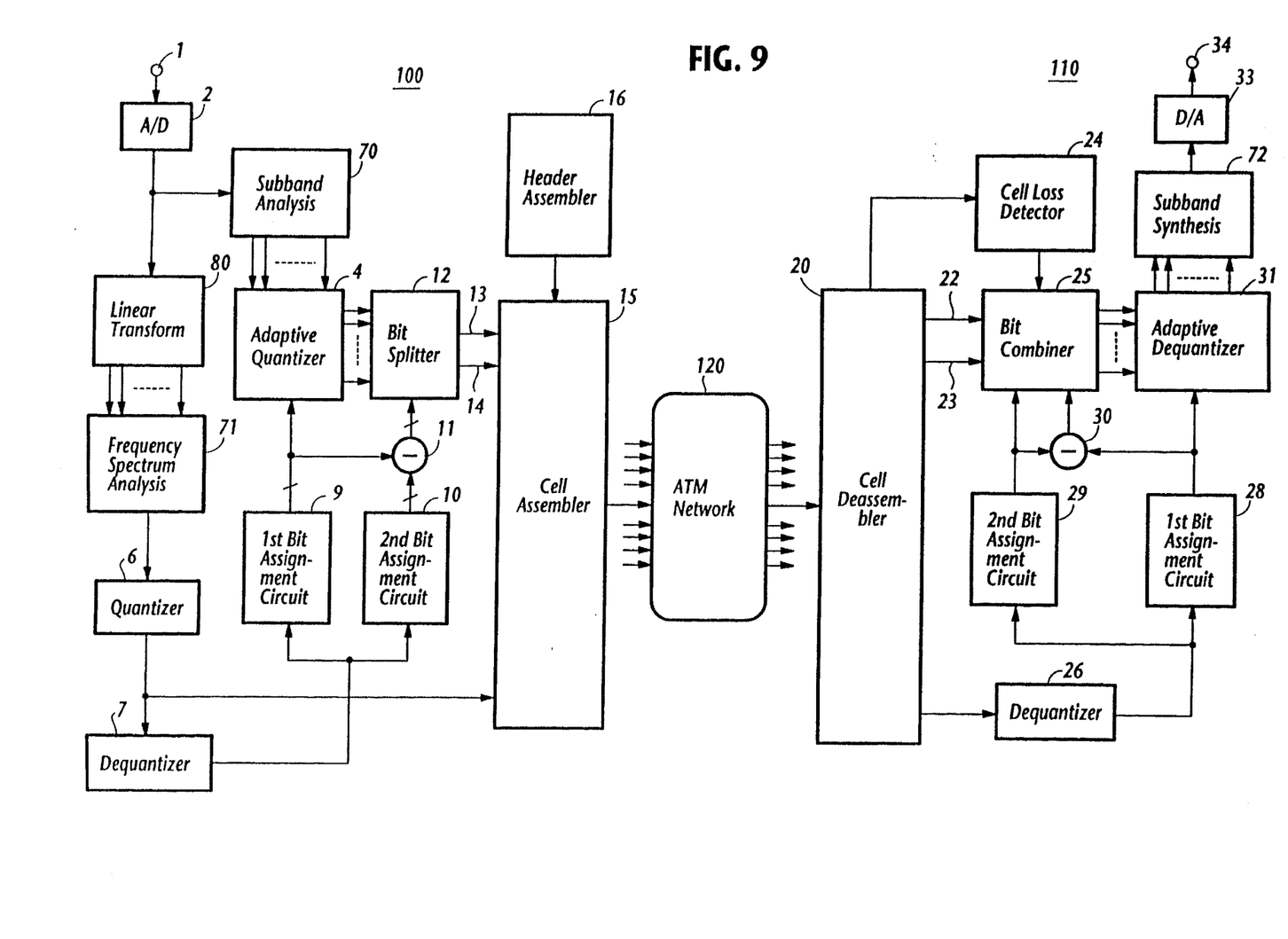
FIG. 9 is a block diagram of a further modification of the present invention.

The embodiment of FIG. 8 is modified as shown in FIG. 9 in which the outputs of subband analyzer 70 are exclusively supplied to adaptive quantizer 4 and a linear transform coder 80 is connected between the output of A/D converter 2 and the frequency spectrum analyzer 71. As in FIG. 8, M digital samples from the A/D converter 2 are treated as an input vector by subband analyzer 70 and linear transform coder 80. For linear transform coding, FFT (fast Fourier transform) technique can be used to advantage. The use of M transform coefficients as inputs of the frequency spectrum analyzer 71 enables it to provide higher resolution spectral analysis than is in the case of the previous embodiment.

Figure 10:
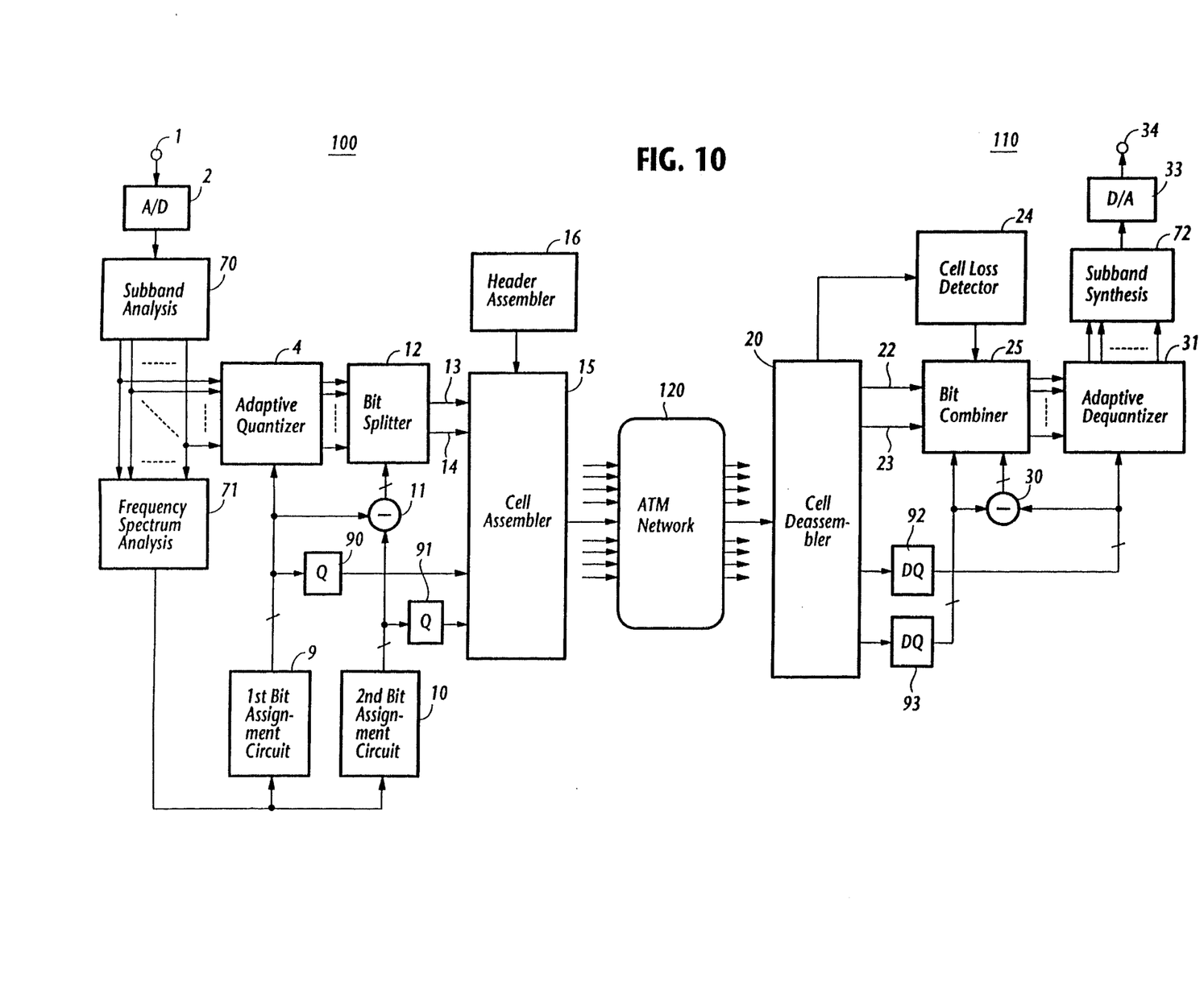
FIG. 10 is a block diagram of a still further modification of the present invention.

The embodiment of FIG. 8 can be simplified as shown in FIG. 10. In this modification, the outputs of first and second bit assignment circuits 9 and 10 are supplied through quantizers 90 and 91 to cell assembler 15 for transmission as the supplementary information, instead of the output of frequency spectrum analyzer 71. At the receiver, the first and second bit assignment circuits 28 and 29 of FIG. 8 are replaced with dequantizers 92 and 93 for dequantizing the transmitted first and second bit assignment signals, respectively. The output of dequantizer 92 is supplied to one input of subtractor 30 and adaptive dequantizer 31 and the output of dequantizer 93 is supplied to the other input of subtractor 30 and to bit combiner 25.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A communication system for a network in which cells are likely to be discarded, comprising:

data compression means for converting N digital samples of an underlying analog signal in the range of audio frequencies to N compressed digital samples;

means connected to said data compression means for generating a first bit assignment signal representative of quantization levels of each of the compressed digital samples corresponding to a first predetermined transmission rate and a second bit assignment signal representative of quantization levels of each of the compressed digital samples corresponding to a second predetermined transmission rate, lower than said first predetermined transmission rate;

an adaptive quantizer having N quantizer elements for respectively quantizing said N compressed digital samples according to said first bit assignment signal;

a first subtractor for generating a first differential signal representative of a difference between the first and second bit assignment signals;

bit splitter means for splitting each of the quantized N compressed digital samples into a first data segment comprising higher significant bits of the quantized digital sample and a second data segment comprising lower significant bits of the quantized digital sample, the number of the lower significant bits being equal to the number of quantization levels represented by the first differential signal;

cell assembler means for composing the first data segments of said quantized N compressed digital samples and said first and second bit assignment signals into a first cell and composing the second data segments of said quantized N compressed digital samples into a second cell, said first cell containing a higher priority indication signifying that the first cell cannot be discarded by said network and said second cell containing a lower priority indication signifying that the second cell can be discarded by said network, said first and second cells being transmitted through said network to a destination;

cell deassembler means, at said destination, for receiving said first and second cells from said network and decomposing said first cell into said first data segments and said first and second bit assignment signals and decomposing said second cell into said second data segments;

a second subtractor for generating a second differential signal representative of a difference between the decomposed first and second bit assignment signals;

detector means for determining whether said second cell is discarded by said network or not;

bit combiner means for combining the decomposed first data segments respectively with the decomposed second data segments according to said decomposed second bit assignment signal and said second differential signal to produce a replica of the quantized N compressed digital samples when said second cell is determined to be not discarded and combining the decomposed first data segments respectively with synthesized data segments according to said second bit assignment signal and said second differential signal to produce a pseudo-replica of the quantized N compressed digital samples when said second cell is determined to be discarded;

an adaptive dequantizer having N dequantizer elements for respectively dequantizing said quantized N compressed digital samples of said replica and said pseudo-relica according to the decomposed first bit assignment signal; and data decompression means for converting the dequantized N compressed digital samples into a signal which is a replica of the N digital samples converted by said data compression means.

2. A communication system for a network in which cells are likely to be discarded, comprising:

data compression means for converting N digital samples of an underlying analog signal in the range of audio frequencies to N compressed digital samples;

means connected to said data compression means for producing a first bit assignment signal representative of quantization levels of each of the compressed digital samples corresponding to a first predetermined transmission rate, a second bit assignment signal representative of quantization levels of each of the compressed digital samples corresponding to a second predetermined transmission rate lower than said first predetermined transmission rate;

a square-and-average circuit for squaring each of said N compressed digital samples and averaging neighboring squared digital samples and deriving therefrom supplementary information;

an adaptive quantizer having N quantizer elements for respectively quantizing said N compressed digital samples according to said first bit assignment signal;

a first subtractor for generating a first differential signal representative of a difference between the first and second bit assignment signals;

bit splitter means for splitting each of the quantized N compressed digital samples into a first data segment comprising higher significant bits of the quantized digital sample and a second data segment comprising lower significant bits of the quantized digital sample, the number of the lower significant bits being equal to the number of quantization levels represented by the first differential signal;

cell assembler means for composing the first data segments of said quantized N compressed digital samples and said supplementary information into a first cell and composing the second data segments of said quantized N compressed digital samples into a second cell, said first cell containing a higher priority indication signifying that the first cell cannot be discarded by said network and said second cell containing a lower priority indication signifying that the second cell can be discarded by said network, said first and second cells being transmitted through said network to a destination;

cell deassembler means, at said destination, for receiving said first and second cells from said network and decomposing said first cell into said first data segments and said supplementary information and decomposing said second cell into said second data segments;

third bit assignment means for deriving from the supplementary information a third bit assignment signal representative of dequantization levels corresponding to said first predetermined transmission rate;

fourth bit assignment means for deriving from the supplementary information a fourth bit assignment signal representative of dequantization levels corresponding to said second predetermined transmission rate;

a second subtractor for generating a second differential signal representative of a difference between the third and fourth bit assignment signals;

detector means for determining whether said second cell is discarded by said network or not;

bit combiner means for combining the first data segments respectively with the decomposed second data segments according to said fourth bit assignment signal and said second differential signal to produce a replica of the quantized N compressed digital samples when said second cell is determined to be not discarded and combining the decomposed first data segments respectively with synthesized data segments according to said fourth bit assignment signal and said second differential signal to produce a pseudo-replica of the quantized N compressed digital samples when said second cell is determined to be discarded;

an adaptive dequantizer having N dequantizer elements for respectively dequantizing said quantized N compressed digital samples of said replica and said pseudo-replica according to said third bit assignment signal; and data decompression means for converting the dequantized N compressed digital samples into a signal which is a replica of the N digital samples converted by said data compression means.

3. A communication system as claimed in claim 2, wherein said data compression means comprises a linear transform coder.

4. A communication system as claimed in claim 3, wherein said first and second bit assignment signals are derived from said supplementary information.

5. A communication system as claimed in claim 2, wherein said data compression means comprises a subband analyzer for decomposing M digital samples into N frequency subbands, and coupling the N frequency subbands to said adaptive quantizer, where M is an integral multiple of the integer N.

6. A communication system as claimed in claim 5, wherein said supplementary information is derived by a frequency spectrum analyzer from said N frequency subbands, and wherein said first and second bit assignment signals are derived from an output signal of said frequency spectrum analyzer.

7. A communication system as claimed in claim 2, wherein said data compression means comprises a subband analyzer for decomposing M digital samples into N frequency subbands, and coupling the N frequency subbands to said adaptive quantizer, where M is an integral multiple of the integer N, and wherein said supplementary information is derived by means comprising a linear transform coder for converting said M digital samples into M transform coefficients and a frequency spectrum analyzer connected to be responsive to said M transform coefficients, said first and second bit assignment signals being derived from an output signal of said frequency spectrum analyzer.

8. A data compression apparatus for a network in which cells are likely to be discarded, comprising:

data compression means for converting N digital samples of an underlying analog signal in the range of audio frequencies to N compressed digital samples;

means connected to said data compression means for generating a first bit assignment signal representative of quantization levels of each of the compressed digital samples corresponding to a first predetermined transmission rate and a second bit assignment signal representative of quantization levels of each of the compressed digital samples corresponding to a second predetermined transmission rate, lower than said first predetermined transmission rate;

an adaptive quantizer having N quantizer elements for respectively quantizing said N compressed digital samples according to said first bit assignment signal;

a subtractor for generating a differential signal representative of a difference between the first and second bit assignment signals;

bit splitter means for splitting each of the quantized N compressed digital samples into a first data segment comprising higher significant bits of the quantized digital sample and a second data segment comprising lower significant bits of the quantized digital sample, the number of the lower significant bits being equal to the number of quantization levels represented by the differential signal; and cell assembler means for composing the first data segments of said quantized N compressed digital samples and said first and second bit assignment signals into a first cell and composing the second data segments of said quantized N compressed digital samples into a second cell, said first cell containing a higher priority indication signifying that the first cell cannot be discarded by said network and said second cell containing a lower priority indication signifying that the second cell can be discarded by said network, said first and second cells being transmitted through said network to a destination.

9. A data decompression apparatus for receiving cells from a network at first and second transmission rates, comprising:

cell deassembler means for receiving first and second cells from said network and decomposing said first cell into first data segments and first and second bit assignment signals and decomposing said second cell into second data segments, each of said first data segments comprising higher significant bits of a quantized version of a compressed digital sample and each of said second data segments comprising lower significant bits of said quantized version of the compressed digital sample, said first bit assignment signal representing quantization levels of the compressed digital sample corresponding to said first transmission rate and said second bit assignment signal representing quantization levels of the compressed digital sample corresponding to said second transmission rate;

a subtractor for generating a differential signal representative of a difference between the first and second bit assignment signals;

detector means for determining whether said second cell is discarded by said network or not;

bit combiner means for combining the first data segments respectively with the second data segments according to said second bit assignment signal and said differential signal to produce a replica of quantized versions of N compressed digital samples when said second cell is determined to be not discarded and combining the first data segments respectively with synthesized data segments according to said second bit assignment signal and said differential signal to produce a pseudo-replica of quantized versions of N compressed digital samples when said second cell is determined to be discarded;

an adaptive dequantizer having N dequantizer elements for respectively dequantizing said quantized versions of N compressed digital samples of said replica and said pseudo-relica according to the first bit assignment signal; and data decompression means for converting the dequantized N compressed digital samples to a decompressed signal.

10. A data compression apparatus for a network in which cells are likely to be discarded, comprising:

data compression means for converting N digital samples of an underlying analog signal in the range of audio frequencies to N compressed digital samples;

means connected to said data compression means for producing a first bit assignment signal representative of quantization levels of each of the compressed digital samples corresponding to a first predetermined transmission rate, a second bit assignment signal representative of quantization levels of each of the compressed digital samples corresponding to a second predetermined transmission rate lower than said first predetermined transmission rate;

a square-and-average circuit for squaring each of said N compressed digital samples and averaging neighboring squared digital samples and deriving therefrom supplementary information;

an adaptive quantizer having N quantizer elements for respectively quantizing said N compressed digital samples according to said first bit assignment signal;

a subtractor for generating a differential signal representative of a difference between the first and second bit assignment signals;

bit splitter means for splitting each of the quantized N compressed digital samples into a first data segment comprising higher significant bits of the quantized digital sample and a second data segment comprising lower significant bits of the quantized digital sample, the number of the lower significant bits being equal to the number of quantization levels represented by the differential signal; and cell assembler means for composing the first data segments of said quantized N compressed digital samples and said supplementary information into a first cell and composing the second data segments of said quantized N compressed digital samples into a second cell, said first cell containing a higher priority indication signifying that the first cell cannot be discarded by said network and said second cell containing a lower priority indication signifying that the second cell can be discarded by said network, said first and second cells being transmitted through said network to a destination.

11. A data decompression apparatus for receiving cells at first and second transmission rates from a network, comprising:

cell deassembler means for receiving first and second cells from said network and decomposing said first cell into first data segments and supplementary information and decomposing said second cell into second data segments, each of said first data segments comprising higher significant bits of a quantized version of a compressed digital sample and each of said second data segments comprising lower significant bits of said quantized version of the compressed digital sample, said supplementary information representing squared-and-averaged values of compressed digital samples;

first bit assignment means for deriving from the supplementary information a first bit assignment signal representative of dequantization levels corresponding to said first transmission rate;

second bit assignment means for deriving from the supplementary information a second bit assignment signal representative of dequantization levels corresponding to said second transmission rate;

a subtractor for generating a differential signal representative of a difference between the first and second bit assignment signals;

detector means for determining whether said second cell is discarded by said network or not;

bit combiner means for combining the first data segments respectively with the second data segments according to said second bit assignment signal and said differential signal to produce a replica of quantized N compressed digital samples when said second cell is determined to be not discarded and combining the first data segments respectively with synthesized data segments according to said second bit assignment signal and said differential signal to produce a pseudo-replica of quantized N compressed digital samples when said second cell is determined to be discarded;

an adaptive dequantizer having N dequantizer elements for respectively dequantizing said quantized N compressed digital samples of said replica and said pseudo-replica according to said first bit assignment signal; and data decompression means for converting the dequantized N compressed digital samples into a decompressed signal.

12. A communication method for a network in which cells are likely to be discarded, comprising the steps of:

a) converting N digital samples of an underlying analog signal in the range of audio frequencies to N compressed digital samples;

b) deriving from said N compressed digital samples a first bit assignment signal representative of quantization levels of each of the compressed digital samples corresponding to a first predetermined transmission rate, and a second bit assignment signal representative of quantization levels of each of the compressed digital samples corresponding to a second predetermined transmission rate lower than said first predetermined transmission rate, and further generating a first differential signal representative of a difference between the first and second bit assignment signals;

c) quantizing said N compressed digital samples according to said first bit assignment signal;

d) splitting each of the quantized N compressed digital samples into a first data segment comprising higher significant bits of the quantized digital sample and a second data segment comprising lower significant bits of the quantized digital sample, the number of the lower significant bits being equal to the number of quantization levels represented by the first differential signal;

e) composing the first data segments of said quantized N compressed digital samples and said first and second bit assignment signals into a first cell and composing the second data segments of said quantized N compressed digital samples into a second cell, said first cell containing a higher priority indication signifying that the first cell cannot be discarded by said network and said second cell containing a lower priority indication signifying that the second cell can be discarded by said network;

f) transmitting said first and second cells to said network;

g) receiving said first and second cells from said network and decomposing said first cell into said first data segments and said first and second bit assignment signals and decomposing said second cell into said second data segments;

h) generating a second differential signal representative of a difference between the decomposed first and second bit assignment signals;

i) combining the decomposed first data segments respectively with the decomposed second data segments according to said decomposed second bit assignment signal and said second differential signal to produce a replica of the quantized N compressed digital samples when said second cell is present and combining the decomposed first data segments respectively with synthesized data segments according to said second bit assignment signal and said second differential signal to produce a pseudo-replica of the quantized N compressed digital samples when said second cell is absent;

j) dequantizing said quantized N compressed digital samples of both of said replica and said pseudo-relica according to the decomposed first bit assignment signal; and k) converting the dequantized N compressed digital samples into a signal which is a replica of the N digital samples converted by the step (a).

13. A communication method for a network in which cells are likely to be discarded, comprising the steps of:

a) converting N digital samples of an underlying analog signal in the range of audio frequencies to N compressed digital samples;

b) generating, from the N compressed digital samples, a first bit assignment signal representative of quantization levels of each of the compressed digital samples corresponding to a first predetermined transmission rate, a second bit assignment signal representative of quantization levels of each of the compressed digital samples corresponding to a second predetermined transmission rate lower than said first predetermined transmission rate, and supplementary information;

c) generating a first differential signal representative of a difference between the first and second bit assignment signals;

d) quantizing said N compressed digital samples according to said first bit assignment signal;

e) splitting each of the quantized N compressed digital samples into a first data segment comprising higher significant bits of the quantized digital sample and a second data segment comprising lower significant bits of the quantized digital sample, the number of the lower significant bits being equal to the number of quantization levels represented by the first differential signal;

f) composing the first data segments of said quantized N compressed digital samples and said supplementary information into a higher priority cell which cannot be discarded by the network and composing the second data segments of said quantized N digital samples into a lower priority cell which can be discarded by said network;

g) transmitting said higher and lower priority cells to said network;

h) receiving said higher and lower priority cells from said network and decomposing said higher priority cell into said first data segments and said supplementary information and decomposing said lower priority cell into said second data segments;

i) deriving from the decomposed supplementary information a third bit assignment signal representative of dequantization levels corresponding to said first predetermined transmission rate and a fourth bit assignment signal representative of dequantization levels corresponding to said second predetermined transmission rate, and generating a second differential signal representative of a difference between the third and fourth bit assignment signals;

j) combining the decomposed first data segments respectively with the decomposed second data segments according to said fourth bit assignment signal and said second differential signal to produce a replica of the quantized N compressed digital samples when said second cell is present and combining the decomposed first data segments respectively with synthesized data segments according to said fourth bit assignment signal and said second differential signal to produce a pseudo-replica of the quantized N compressed digital samples when said second cell is absent;

k) dequantizing said quantized N compressed digital samples of both of said replica and said pseudo-relica according to said third bit assignment signal; and l) converting the N dequantized compressed digital samples into a signal which is a replica of the N digital samples converted by the step (a).

\* \* \* \* \*

UNITED STATES PATENT AND TRADEMARK OFFICE
CERTIFICATE OF CORRECTION

PATENT NO. : 5,455,841
DATED : October 3, 1995
INVENTOR(S) : Fumie Hazu

It is certified that error appears in the above-indentified patent and that said Letters Patent is hereby corrected as shown below:

Col. 6, line 37, delete "$h_{2i}$", insert --$h_{21}$--.

Signed and Sealed this

Eighteenth Day of June, 1996

Attest:

BRUCE LEHMAN

*Attesting Officer*    *Commissioner of Patents and Trademarks*